(12) United States Patent
Kurita

(10) Patent No.: US 8,225,437 B2
(45) Date of Patent: Jul. 24, 2012

(54) MIXING FAUCET SYSTEM FOR AIRCRAFT

(75) Inventor: Yoichi Kurita, Tokyo (JP)

(73) Assignee: Jamco Corporation, Tokyo (JP)

( * ) Notice: Subject to any disclaimer, the term of this patent is extended or adjusted under 35 U.S.C. 154(b) by 876 days.

(21) Appl. No.: 12/167,557

(22) Filed: Jul. 3, 2008

(65) Prior Publication Data
US 2009/0083906 A1 Apr. 2, 2009

(30) Foreign Application Priority Data
Oct. 1, 2007 (JP) .................................. 2007-257263

(51) Int. Cl.
*A47K 1/04* (2006.01)
(52) U.S. Cl. .................................................. 4/619
(58) Field of Classification Search ................ 4/619
See application file for complete search history.

(56) References Cited

U.S. PATENT DOCUMENTS

| | | | |
|---|---|---|---|
| 4,645,145 A * | 2/1987 | Alie | 244/118.5 |
| 4,882,792 A * | 11/1989 | Vincent | 4/323 |
| 4,996,644 A * | 2/1991 | Fukuchi et al. | 701/104 |
| 5,504,950 A * | 4/1996 | Natalizia et al. | 4/623 |
| 5,577,660 A | 11/1996 | Hansen | |
| 6,305,663 B1 * | 10/2001 | Miller | 251/129.04 |
| 2004/0256009 A1 * | 12/2004 | Valenzuela | 137/607 |

FOREIGN PATENT DOCUMENTS

| | | |
|---|---|---|
| EP | 195271 A2 | 9/1986 |
| JP | 6-40399 A | 2/1994 |
| JP | 10-103536 A | 4/1998 |
| JP | 10-121534 A | 5/1998 |
| JP | 2000-120124 A | 4/2000 |
| JP | 2001-207499 A | 8/2001 |
| JP | 2002-122285 A | 4/2002 |
| WO | 01/59345 A1 | 8/2001 |
| WO | 02/02879 A2 | 1/2002 |

OTHER PUBLICATIONS

Japanese Office Action dated Oct. 13, 2009, issued in corresponding Japanese Patent Application No. 2007-257263.
European Search Report dated Apr. 22, 2010, issued in corresponding European Patent Application No. 08405181.2.

* cited by examiner

*Primary Examiner* — Gregory Huson
*Assistant Examiner* — Karen L Younkins
(74) *Attorney, Agent, or Firm* — Westerman, Hattori, Daniels & Adrian, LLP

(57) ABSTRACT

The invention provides a mixing faucet system for an aircraft capable of minimizing as much as possible the size of the portion visible to the user, to thereby enhance the design flexibility of the wash basin and the lavatory including the wash basin. A mixing faucet system 1 for an aircraft comprises a discharge unit 2 of hot and cold water disposed on the wash basin in a lavatory of an aircraft, and a supply unit 3 separated from the discharge unit 2 and provided at a remote location from the wash basin for supplying to the discharge unit 2 through a hose 4 cold water and hot water either independently or in a mixed state. The discharge unit 2 is not equipped with a mixing function, and the supply unit 3 provided with the mixing function can be placed at a position remote from the discharge unit 2. Therefore, the discharge unit 2 is the only portion of the mixing faucet system visible to the user in the lavatory unit, and therefore, the flexibility and freedom of design of the discharge unit 2 itself, the wash basin and the lavatory unit including the same can be improved.

7 Claims, 3 Drawing Sheets

| TEMPERATURE SETTING MODE | H SOLENOID VALVE | : | C SOLENOID VALVE |
|---|---|---|---|
| H | CONTINUOUSLY ON | : | OFF |
| HHC | CONTINUOUSLY ON | : | INTERMITTENTLY ON-OFF |
| MID | CONTINUOUSLY ON | : | CONTINUOUSLY ON |
| HCC | INTERMITTENTLY ON-OFF | : | CONTINUOUSLY ON |
| C | OFF | : | CONTINUOUSLY ON |

COMBINED WATER TEMPERATURE

| TEMPERATURE SETTING MODE | MIXOUT TEMPERATURE(°C) | DISCHARGE QUANTITY (l / minute) 45PSI | DISCHARGE QUANTITY (l / minute) 25PSI |
|---|---|---|---|
| H | 3 6 | 1. 3 | 1. 0 |
| H H C | 3 2 | 1. 7 | 1. 3 |
| M I D | 2 7 | 2. 0 | 1. 5 |
| H C C | 2 2 | 1. 7 | 1. 2 5 |
| C | 1 4 | 1. 3 | 0. 9 5 |

MIXING FAUCET SYSTEM FOR AIRCRAFT

The present application is based on and claims priority of Japanese patent application No. 2007-257263 filed on Oct. 1, 2007, the entire contents of which are hereby incorporated by reference.

BACKGROUND OF THE INVENTION

1. Field of the Invention

The present invention relates to a mixing faucet system for an aircraft disposed in lavatory units of aircrafts.

2. Description of the Related Art

Conventionally, in lavatory units of aircrafts, cold water is provided via pipes disposed in the aircraft and hot water is provided by heating the cold water using a small electric water heater disposed in the lavatory unit. A mixing faucet mixes the cold water and hot water within the lavatory unit of the aircraft so as to provide water having a desired temperature. In the recent mixing faucet for aircrafts, a control valve is provided in a discharge unit attached to the wall of the lavatory so as to control the water temperature and water quantity.

In place of mechanical faucets in which the discharge lever is operated manually to open a mechanical valve adopted in conventional mixing faucets for aircrafts, electronic faucets are being adopted in which the opening and closing of solenoid valves are controlled based on the sensed result via an infrared sensor. The latter mixing faucet arrangement responds to the psychology of the user wishing to avoid contact with the mixing faucet disposed in the lavatory unit as much as possible.

On the other hand, methods for controlling the water temperature include a manual method in which the lever directly connected to the mixing valve is operated manually and an electric method in which a motor-driven flow rate control valve is operated via a touch switch. The manual method is more popular in aircrafts since the manual system has lighter weight, simple structure and lower failure rate.

According to the manual-type temperature control system, however, the user must manually operate a lever with his or her hands to control the water temperature, which is against the psychology of the user to avoid contact with the lever. Furthermore, the water discharged during the several seconds of water temperature control is consumed vainly.

Moreover, when the aircraft is parked for a long time in a cold district, the water in the pipes of the aircraft may freeze when draining of water is not performed, so that it is preferable for the mixing faucet system to endure as much number of times of freezing as possible. Currently, however, the durability relies on the expansion of the water supply pipe and the intensity of the material used for the faucet, so that when the water is repeatedly frozen, the faucet system is subjected to mechanical fatigue and cannot endure a large number of times of freezing.

However, the mixing unit and the discharge unit of the prior art mixing faucet were integrated, so that the size of the faucet system visible to the user in the lavatory unit was large, and the faucet system was subjected to design limitations from the viewpoint of designing of wash basins and lavatory units.

Japanese Patent Application Laid-Open Publication No. 0.10-103536 (patent document 1) discloses a hot and cold water mixing-supplying system comprising a mixing faucet to which a hot water side piping through which hot water flows and a cold water side piping through which cold water flows are connected, wherein via a temperature sensor for detecting the temperature of the hot water flowing through the hot water side piping and a solenoid valve switched by detection of the temperature sensor, an instant boiler is provided on a primary portion of the hot water side piping. According to the hot and cold water mixing-supplying system, when hot water used previously remains in a cooled state in the hot water side piping, the solenoid valve is switched by the sensed temperature of the temperature sensor, so that the cooled water is supplied to the instant boiler and the hot water stored in advance in the instant boiler is output and supplied to the mixing faucet. Moreover, when the hot water formed in the hot water supplying system exceeds a desirable temperature, the solenoid valve is switched by the sensed temperature of the temperature sensor, according to which water is sent directly to the mixing faucet without passing the instant boiler and discharged through the discharge port. As described, the disclosed system enables to provide hot water mixed to a desirable temperature instantly when the mixing faucet is operated, and to provide water continuously.

In lavatory units of aircrafts, it is desirable that the discharge unit of the faucet system visible to the user is downsized. Therefore, the problem to be solved in the hot and cold water mixing faucet within lavatory units of aircrafts is to downsize the portion visible to the user as much as possible.

SUMMARY OF THE INVENTION

The object of the present invention is to provide a mixing faucet system for aircrafts capable of downsizing the portion visible to the user as much as possible in the lavatory unit of aircrafts so as to improve the flexibility of design of the wash basin and the lavatory unit including the same.

In order to solve the problems mentioned above, the present invention provides a mixing faucet system for an aircraft comprising a discharge unit of hot and cold water disposed on a wash basin in a lavatory unit of an aircraft; and a supply unit separated from the discharge unit and disposed at a remote location from the wash basin for supplying cold water and hot water taken therein either independently or in a mixed state to the discharge unit through a connecting pipe.

According to the present mixing faucet system for an aircraft, cold water and hot water are taken in through the supply unit, where the cold water and hot water are sent either independently or in a mixed state via a connecting pipe to a discharge unit, where the water is supplied for use by the user. In the present mixing faucet system, the discharge unit and the supply unit are two separately formed components, wherein the discharge unit disposed on the wash basin of the lavatory unit is not provided with a mixing function, whereas the supply unit having the mixing function is disposed at a remote location from the wash basin, such as in the storage of the lavatory unit. Therefore, in the lavatory unit, the only portion of the mixing faucet system visible to the user in the lavatory unit is the discharge unit, and therefore, it becomes possible to enhance the flexibility and freedom of design of the discharge unit, the wash basin and the lavatory unit.

In the present mixing faucet system for an aircraft, the discharge unit includes a temperature control means for controlling the temperature of water being discharged; the supply unit includes a cold water intake and hot water intake for taking in cold water and hot water independently, and a mixing means for mixing the cold and hot water; and a control signal reflecting the temperature designated via the temperature control means of the discharge unit is sent via a control wire to the mixing means of the supply unit. The user operates the temperature control means disposed on the discharge unit to designate the water temperature, and the mixing means is controlled based on the designated temperature so as to control the temperature of the water being discharged.

Moreover, similar to the case of the temperature control means, the discharge unit includes a water quantity control means for controlling the water quantity of the hot and cold water being discharged; wherein a control signal reflecting the water quantity designated by the water quantity control means of the discharge unit can be sent via the control wire to the mixing means of the supply unit.

Furthermore, the discharge unit can include a temperature display means for changing the content of display such as color and display area according to the temperature designated via the temperature control means.

In the mixing faucet system for an aircraft according to the present invention, the supply unit includes a first chamber and a second chamber independently connected between the cold water intake or the hot water intake and the mixing means, respectively, each having an air reservoir portion formed in the interior of the chamber.

Furthermore, the supply unit can include a third chamber disposed on an outlet side of the mixing means connected to the connecting pipe, having an air reservoir portion formed in the interior of the chamber.

Along with the rapid change of flow channel, such as when the solenoid valve is activated, the water pressure at the upstream side is raised drastically and water hammer occurs, by which noise and shock occurs. According to the mixing faucet system for an aircraft according to the present invention, when the first, second or third chamber has an air reservoir formed therein, the air within the air reservoir is compressed by the water hammer or other pressure fluctuation reaching the chamber, and the change of volume of the air absorbs and suppresses drastic water pressure fluctuation. Therefore, the water hammer becomes extremely weak, reducing the possibility of damage that may be caused to mechanical portions such as the solenoid valve.

In the present mixing faucet system for an aircraft, the mixing means includes a first solenoid valve and a second solenoid valve each respectively connected to the cold water intake and the hot water intake, and the water temperature of the mixed hot and cold water can be controlled by varying the duty ratio of each of the first solenoid valve and the second solenoid valve according to the designated temperature.

In the above example, the respective duty ratio can be varied so that a total water quantity discharged from the first solenoid valve and the second solenoid valve is substantially the same before and after varying the designated temperature.

The supply unit has two small and light solenoid valves for cold water and hot water built therein for mixing the cold and hot waters, and a cold water pipe and a hot water pipe are respectively connected to the solenoid valves. By varying the valve opening time per unit time of the solenoid valves (duty ratio), it becomes possible to control the temperature of the mixed water. Hot water can be obtained by branching a portion of the cold water before the cold water intake and passing the same through an electric water heater, and the thus-obtained hot water is supplied to the hot water intake.

In the above-described mixing faucet system for an aircraft having two solenoid valves, the mixing means includes connecting channels detouring and connecting the upstream side and the downstream side of the first solenoid valve and the second solenoid valve, respectively, and wherein each connecting channel is at least equipped with a vent valve for draining the water within the first solenoid valve and the second solenoid valve.

Further according to the present example, the mixing means includes an upper block and a lower block vertically fit to one another at a projection and a recess in a liquid-tight state and in a mutually displaceable manner, wherein each connecting channel is extended vertically across the upper block and the lower block in the projection and the recess.

Moreover, the mixing means can include a spring means for biasing the upper block and the lower block toward each other in a direction enhancing the fitting state thereof.

When the aircraft flies to a cold district with hot water in the faucet system, normally the water within the water supply system is drained to prevent water from freezing in the system. However, when the operator forgets to drain the water, ice is formed by which the volume is increased and the pressure within the pipes increase, causing damage to the solenoid valves and the hoses. Therefore, by designing the system so that water can be drained respectively through vent valves arranged in the connecting channels detouring the first solenoid valve and the second solenoid valve, respectively, it becomes possible to drain water from each solenoid valve. By forming an upper block and a lower block that fit to each other mutually in a liquid-tight sate in the mixing means, when the pressure within the pipes exceed a predetermined value, the volume of the fitting portion between the blocks is increased, and therefore, extreme increase of inner pressure can be prevented. When a spring means for biasing the upper block and the lower block mutually in the direction enhancing the fitting thereof is provided, the volume of the fitting portion is increased against the spring force of the spring means if the pressure in the pipes is increased due to freezing of water. When the ice melts, the two blocks will move in the direction reducing the volume of the fitting portion by the spring force of the spring means, so that mechanical damage can be suppressed even after repeated freezing.

The mixing faucet system for an aircraft according to the present invention arranged as described above exerts the following effects. That is, the mixing faucet system for an aircraft includes a discharge unit and a supply unit composed of two separate portions, wherein the discharge unit disposed on a wash basin in the lavatory unit does not include a mixing function, so that the structure thereof is downsized and simplified, enhancing the flexibility and freedom of the design of the discharge unit, the wash basin and the lavatory unit of the aircraft including the same, and therefore, the design can have more variety. Further, since the only major functional components are the solenoid valves provided in the supply unit to realize a mixing function, the reliability of the system can be enhanced.

DETAILED DESCRIPTION OF THE PREFERRED EMBODIMENTS

Figure 1:
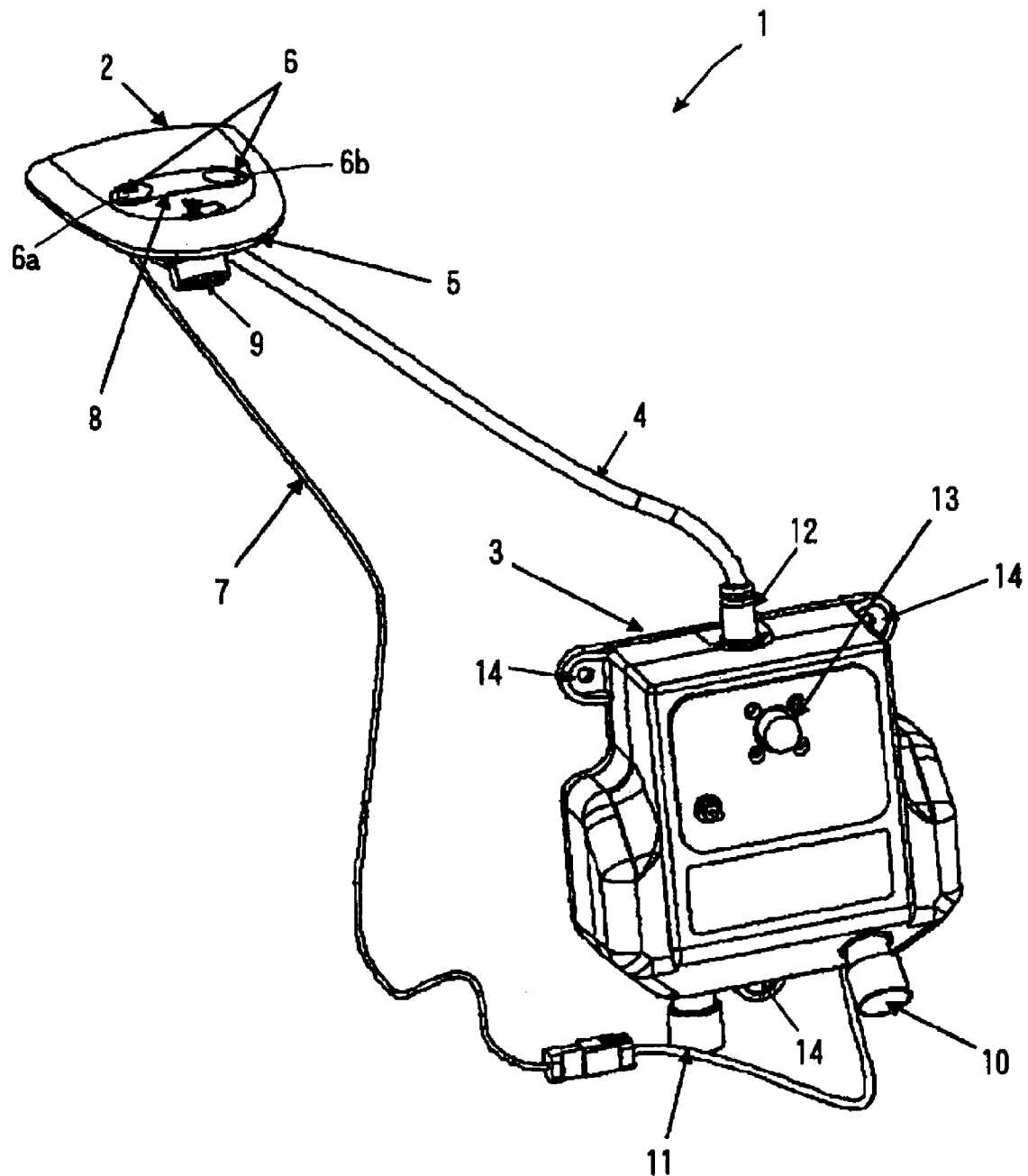
FIG. 1 is a perspective view illustrating an example of a mixing faucet system for an aircraft according to the present invention.
Figures 2, 3:
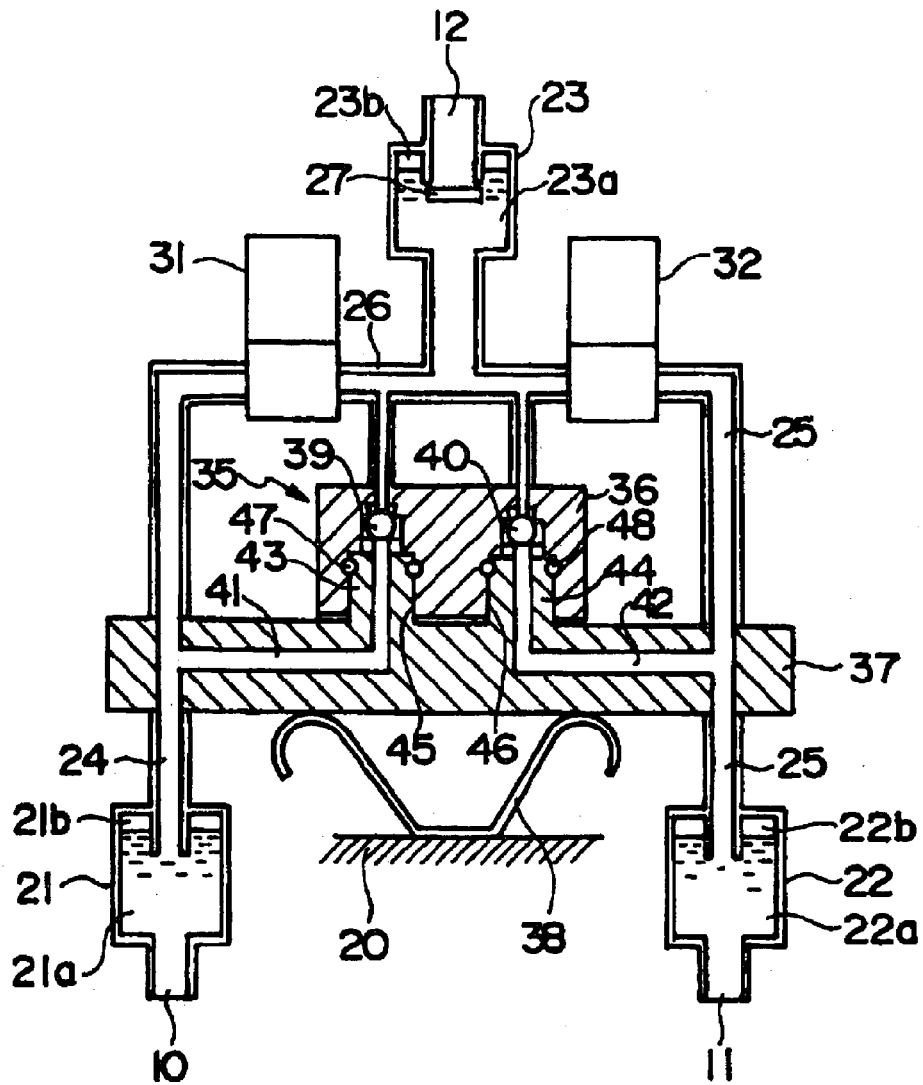
FIG. 2 is a circuit diagram showing one example of a supply unit of a mixing faucet system for an aircraft according to FIG. 1.
FIG. 3 is a table of temperature setting modes of the mixing faucet system for an aircraft according to the present invention.

Now, the preferred embodiments of the mixing faucet system for an aircraft according to the present invention will be described with reference to the accompanying drawings. FIG. 1 is a perspective view illustrating one example of a mixing faucet system for an aircraft according to the present invention, and FIG. 2 is a circuit diagram illustrating one example of a supplying unit of a mixing faucet system for an aircraft illustrated in FIG. 1.

A mixing faucet system for an aircraft (herein after referred to as mixing faucet system) 1 illustrated in FIG. 1 is largely divided into two parts, a hot and cold water discharge unit 2 disposed on a wash basin in a lavatory unit of an aircraft, and a supply unit 3 having the function to mix cold water and hot water provided thereto. The discharge unit 2 and the supply unit 3 are mutually connected via a hose 4 functioning as a connecting pipe, and a control wire 7 for sending to the supply unit 3 control signals obtained based on detection signals and setting signals from an infrared radiation sensor 5 or a temperature control switch 6 disposed on the discharge unit 2.

The discharge unit 2 is disposed at a position visible to the eye of the user on the wash basin in the lavatory unit, but the supply unit 3 is arranged at a position not directly visible to the user, such as in the wall portion or a storage space of the lavatory unit. Since the discharge unit 2 is not equipped with a mixing function, the inner structure thereof can be simplified and the overall size thereof can be reduced, and therefore, the design freedom of the discharge unit 2 or design freedom of the lavatory including the wash basin around the discharge unit 2 can be improved.

The discharge unit 2 is equipped with a temperature display unit 8 disposed on the upper face of the discharge unit 2 with respect to a temperature control switch 6, and a discharge port 9 functioning as a tap for discharging the hot and cold water supplied from the supply unit 3 via the hose 4. The temperature control switch 6 is composed, for example, of a low temperature switch 6a operated when the user wishes to discharge more cold water and a high temperature switch 6b operated when the user wishes to discharge more hot water. The temperature control switch 6 is a touch switch requiring very little contact, which corresponds to the psychology of users favoring as little contact as possible. When switch 6a or 6b is pressed, signals are sent to the mixing function of the supply unit 3, based on which the selection or mixing of cold water and hot water is controlled, and the water having a desirable temperature is discharged through the discharge port 9.

The temperature display unit 8 can be composed of, for example, an LED display which is small sized and consumes little power. By combining the colors, which are red, orange and blue, of the LED, and the number of illuminated diodes per each color, multiple discharge temperatures can be distinguished and displayed.

The infrared radiation sensor 5 disposed close to the discharge port 9 detects that the user has put his or her hands or fingers near the discharge port 9 or moved his or her hands or fingers away from the discharge port 9, and outputs a detection signal, based on which a control signal is sent via the control wire 7 to the supply unit 3. The discharge unit 2 has built therein a valve control unit (not shown) for controlling the mixing function and the discharge operation of the supply unit 3 corresponding to the temperature set via the operation of the temperature control switch 6 and the detection of hands or fingers of the user via the infrared radiation sensor 5. The control signal output from the valve control unit is sent via the control wire 7 to the supply unit 3.

The supply unit 3 is equipped with a hot water intake 10, a cold water intake 11, and an outlet 12 connected to the hose 4 for supplying hot and cold water to the discharge unit 2. The supply unit 3 is further equipped with a power supply connector 13 connected to the power supply to activate the mixing function described in detail later. In the supply unit 3, the hot water taken in through the hot water intake 10 and the cold water taken in through the cold water intake 11 are either fed independently or in a mixed state through the outlet 12 via the hose 4 to the discharge unit 2. In order to control the starting or stopping of the discharge of hot water or cold water with a predetermined temperature through the discharge port 9 of the discharge unit 2, control signals obtained based on the detection via the infrared radiation sensor 5 and settings set via the temperature control switch 6 are sent via the control wire 7 to the supply unit 3, and the supply unit 3 having received the control signals controls the mixing function based on the control signals. The supply unit 3 is attached to a fixing portion such as a wall of the lavatory via fastening means such as bolts at multiple mounting portions 14. Hot water can be obtained by branching a portion of the cold water and passing the same through an electric water heater.

FIG. 2 shows in schematic view an example of the feed water circuit included in the supply unit 3. The hot water intake port 10 and the cold water intake port 11 are each respectively connected to a first chamber 21 and a second chamber 22 fixed to a main body 20 of the supply unit 3. The first chamber 21 and the second chamber 22 are each respectively connected via a flow channel 24 and 25 to a first solenoid valve 31 and a second solenoid valve 32 that realize the mixing function. As illustrated, the first chamber 21 and the second chamber 22 have pipes of the exit-side flow channels 24 and 25 soaked in reservoir water 21a and 22a in chambers 21 and 22, and on the upper portion of the chambers 21 and 22 are formed air reservoirs 21b and 22b.

The exit sides of the first solenoid valve 31 and the second solenoid valve 32 are connected via a flow channel 26, and the flow channel 26 is connected to a third chamber 23, to which the outlet 12 is connected. The third chamber 23 includes reservoir water 23a and an air reservoir 23b formed on the upper portion thereof. A flow rate control member 27 formed of a plate member is placed within the reservoir water 23a, and a clearance determining the flow rate is formed around the plate member.

A mixing housing 35 composed of a fixed upper block 36 and a lower block 37 fit to the upper block 36 in a floating state in the vertical direction is disposed within the supply unit 3. The lower block 37 is biased toward the upper block 36 via a spring 38.

Vent valves 39 and 40 for draining water are disposed within the upper block 36. The vent valve 39 is disposed on a flow channel 41 which is a connecting channel branched from the flow channel 24 extending from the first chamber 21 in such a manner as to bypass the first solenoid valve 31 and reach the flow channel 26. Similarly, the vent valve 40 is disposed on a flow channel 42 which is a connecting channel branched from the flow channel 25 extending from the second chamber 22 in such a manner as to bypass the second solenoid valve 32 and reach the flow channel 26.

Projections 43 and 44 extending toward the upper block 36 are formed on the lower block 37, wherein the projections 43 and 44 are respectively fit into recesses 45 and 46 formed in the upper block 36 and connected to the vent valves 39 and 40.

The flow channel 41 passes through the projection 43, reaches the vent valve 39, further passes through the upper block 36 and connects to the flow channel 26. Furthermore, the flow channel 42 passes through the projection 44, reaches the vent valve 40, further passes through the upper block 36 and connects to the flow channel 26. O rings 47 and 48 are fit respectively to the fitting planes between the projections 43 and 44 and the recesses 45 and 46, which allow the upper block 36 and the lower block 37 to be somewhat displaced while maintaining a liquid-tight state (preventing water leakage) in the fitting direction.

Next, the operation of the supply unit 3 to supply cold water, hot water and mixed water will be described. At first, cold water and hot water are respectively supplied through the hot water intake 10 and the cold water intake 11. When mixing cold water and hot water, the temperature of the mixed hot and cold water is controlled by the ratios of opening time per unit time of the first solenoid valve 31 and the second solenoid valve 32 (duty ratios). The flow rate of the mixed water outlet is determined by the opening-closing time ratio of the first solenoid valve 31 and the second solenoid valve 32. The flow rate control member 27 controls the total flow rate at the outlet side when both solenoid valves 31 and 32 are opened to be substantially equivalent to the flow rate when only either one of the first solenoid valve 31 or the second solenoid valve 32 is fully opened. This arrangement enables to minimize the change in flow rate when both the solenoid valves 31 and 32 are opened to when either one of the solenoid valves 31 or 32 is opened.

When the solenoid valves 31 and 32 are closed, water hammer tends to occur on the upstream side of the solenoid valves 31 and 32 due to increased pressure. However, according to the present arrangement, water hammer and other pressure fluctuation is consumed in compressing the air within the air reservoir 21b and 22b within the first chamber 21 and the second chamber 22 upon reaching the entrance of the first chamber 21 and the second chamber 22, and the change of volume caused thereby absorbs and suppresses extreme water pressure fluctuation. Therefore, water hammer becomes significantly small. Further, when use of the water output through the discharge unit 2 is stopped, the water pressure at the outlet 12 side is fluctuated, and when the solenoid valve 31 or the solenoid valve 32 is activated, the water pressure of the water 23a within the third chamber 23 pulsates, but such changes of pressure is consumed in compressing the air within the air reservoir 23b, by which the exit water pressure change, in other words, the water hammer, is minimized.

When an aircraft flies to and stays in a cold district, draining is normally performed via the vent valves 39 and 40, but if draining is not performed, the water supply system will freeze. When freezing occurs, since the volume of ice is greater than the volume of water, the pressure of ice inside the mixing housing 35 will increase. According to the present embodiment, the lower block 37 will be displaced downward with respect to the upper block 36 via guidance along the recessed and projected fitting portion, but this displacement stops at a position where the downward force balances with the reaction force via the deflection of the spring 38. As a result, the inner volume of the pipes of the flow channels 41 and 42 is increased, so that the expansion of volume caused by freezing is absorbed by this increase in volume. Therefore, it becomes possible to prevent excessive pressure increase from being caused in the pipes due to freezing, and to prevent the solenoid valves 31 and 32 as major functional components from being damaged by freezing. Even when freezing occurs repeatedly, the level of damage caused by the freezing can be suppressed.

Figures 4, 5:
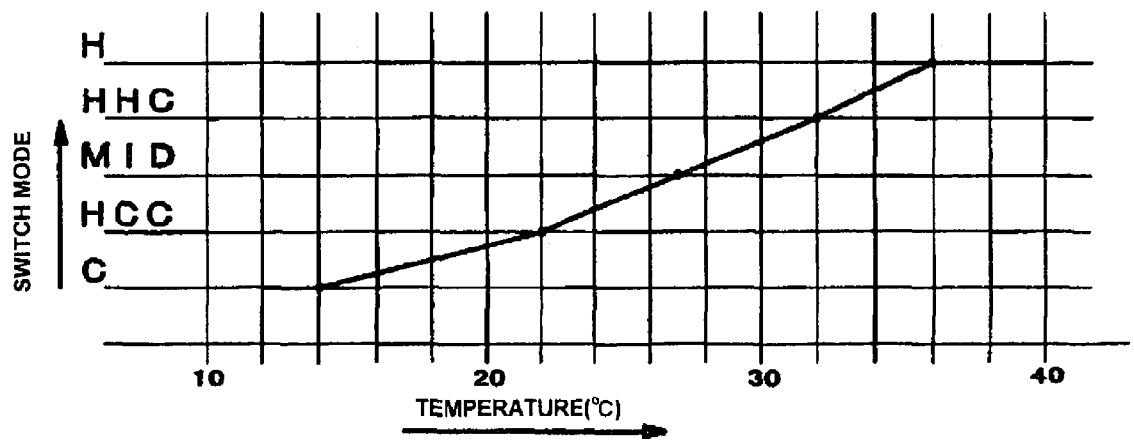
FIG. 4 is a table showing the relationship between the set temperature, the water temperature and the discharge quantity of discharged water of the mixing faucet system for an aircraft according to the present invention.
FIG. 5 is a graph showing the variation of temperature of the discharged water (horizontal axis) when the temperature setting mode (vertical axis) is varied in the mixing faucet system for an aircraft according to the present invention.

FIGS. 3 through 5 are charts and graphs showing the experiment results of the mixing faucet system according to the present invention. FIG. 3 shows a list of the temperature setting modes of the mixing faucet system according to the present invention. In the present embodiment, there are five levels of temperature setting modes, from 100% cold water to 100% hot water. In mode H where the set temperature is highest, the H solenoid valve (second solenoid valve 32) is continuously turned on while the C solenoid valve (first solenoid valve 31) is turned off, so that the supply of cold water is blocked and only the hot water from the electric water heater is supplied 100% via the H solenoid valve. By mixing cold water and hot water, intermediate temperature water can be obtained.

In mode C where the set temperature is lowest, the H solenoid valve is turned off while the C solenoid valve is continuously turned on, so that the supply of hot water from the electric water heater is blocked and only the cold water is supplied 100% via the C solenoid valve. The temperature setting modes can be divided into five levels, as in the present embodiment, or into any other number of levels.

In mode MID where the set temperature is intermediate, the H solenoid valve and the C solenoid valve are both continuously turned on. By the operation of the flow rate control member 27, even when both solenoid valves 31 and 32 are fully opened, the flow rate of the mixed water being supplied is equal to the flow rate according to mode H or mode C.

In mode HHC where the temperature is set between mode H and mode MID, the H solenoid valve is continuously turned on while the C solenoid valve is turned on and off intermittently, whereas in mode HCC where the temperature is set between mode C and mode MID, the H solenoid valve is turned on and off intermittently while the C solenoid valve is continuously turned on, so that the supplied mixed water has a temperature biased toward the temperature obtained when the solenoid valve turned on continuously.

The discharge water temperature and discharge quantity of each temperature setting mode illustrated in FIG. 3 is shown in the table of FIG. 4. In the prior art, when the water pressure is varied from 25 psi to 45 psi, the discharge water quantity was fluctuated greatly with almost double fluctuation range. However, according to the present embodiment, even when the discharge water temperature is changed from mode H to mode C, and even when the discharge pressure is varied from 45 PSI to 25 PSI, the discharge quantity (l/min) is varied but the variation quantity is not significant, so that the user will not feel uncomfortable by the discharge condition of hot and cold water.

FIG. 5 illustrates a graph showing the state of temperature variation (horizontal axis: ° C.) when the switch mode, that is, the temperature setting mode (vertical axis), is varied. As shown in the graph of FIG. 5, the relationship between the set temperature and the discharge water temperature is substantially linear along the steps of the temperature setting mode, and the quantity of operation, that is, the temperature setting mode that the user selects, matches the sense of the user actually touching the water discharged through the discharge port 9. Therefore, the user can use hot and cold water without feeling any discomfort.

According to the present hot and cold water mixing faucet system, during normal times and after the lapse of a predetermined period of time, the set temperature is preferably automatically set to the intermediate position. Therefore, normally it is not necessary to perform temperature control, and the water consumed during temperature control can be minimized. When the touch switch is pressed, a corresponding temperature display is shown and a water of the desired temperature is provided. Therefore, the user is required to touch the faucet only if the user needs to specifically control the temperature.

What is claimed is:

1. A mixing faucet system for an aircraft comprising:
a discharge unit of hot and cold water disposed on a wash basin in a lavatory unit of an aircraft; and
a supply unit separated from the discharge unit and disposed at a remote location from the wash basin for supplying cold water and hot water taken therein either independently or in a mixed state to the discharge unit through a connecting pipe, wherein
the discharge unit includes a temperature control means for controlling the temperature of the hot and cold water being discharged,
the supply unit includes a cold water intake and hot water intake for taking in cold water and hot water independently, and a mixing means for mixing the cold and hot water, a first chamber and a second chamber independently connected between the cold water intake or the hot water intake and the mixing means, respectively, each having an air reservoir portion formed in the interior of the chamber, and a third chamber disposed on an outlet side of the mixing means connected to the connecting pipe, having an air reservoir portion formed in the interior of the chamber,
the mixing means includes a first solenoid valve and a second solenoid valve each respective connected to the cold water intake and the hot water intake,
a control signal reflecting the temperature designated via the temperature control means of the discharge unit is sent via a control wire to the mixing means of the supply unit, and
the water temperature of the mixed water is controlled by varying the respectively duty ratios of the first solenoid valve and the second solenoid valve according to the designated temperature, wherein
the mixing means includes an upper block and a lower block vertically fit to one another at a projection and a recess in a liquid-tight state and in a mutually displaceable manner, wherein each connecting channel is extended vertically across the upper block and the lower block in the projection and the recess.

2. The mixing faucet system for an aircraft according to claim 1 wherein
the discharge unit includes a water quantity control means for controlling the water quantity of the hot and cold water being discharged; and
a control signal reflecting the water quantity designated by the water quantity control means of the discharge unit is sent via the control wire to the mixing means of the supply unit.

3. The mixing faucet system for an aircraft according to claim 1, wherein
the discharge unit includes a temperature display means for changing the content of display according to the temperature designated via the temperature control means.

4. The mixing faucet system for aircraft according to claim 1, wherein the third chamber has disposed therein a flow rate control means for controlling the quantity of water being sent out.

5. The mixing faucet system for an aircraft according to claim 1, wherein the respective duty ratios are varied so that a total water quantity discharged from the first solenoid valve and the second solenoid valve is substantially the same before and after varying the designated temperature.

6. The mixing faucet system for an aircraft according to claim 1, wherein the mixing means includes connecting channels detouring and connecting the upstream side and the downstream side of the first solenoid valve and the second solenoid valve, respectively, and wherein each connecting channel is equipped with a vent valve for draining the water within the first solenoid valve and the second solenoid valve.

7. A mixing faucet system for an aircraft, comprising:
a discharge unit of hot and cold water disposed on a wash basin in a lavatory unit of an aircraft; and
a supply unit separated from the discharge unit and disposed at a remote location from the wash basin for supplying cold water and hot water taken therein either independently or in a mixed state to the discharge unit through a connecting pipe, wherein
the discharge unit includes a temperature control means for controlling the temperature of the hot and cold water being discharged,
the supply unit includes a cold water intake and hot water intake for taking in cold water and hot water independently, and a mixing means for mixing the cold and hot water, a first chamber and a second chamber independently connected between the cold water intake or the hot water intake and the mixing means, respectively, each having an air reservoir portion formed in the interior of the chamber, and a third chamber disposed on an outlet side of the mixing means connected to the connecting pipe, having an air reservoir portion formed in the interior of the chamber,
the mixing means includes a first solenoid valve and a second solenoid valve each respective connected to the cold water intake and the hot water intake,
a control signal reflecting the temperature designated via the temperature control means of the discharge unit is sent via a control wire to the mixing means of the supply unit, and
the water temperature of the mixed water is controlled by varying the respectively duty ratios of the first solenoid valve and the second solenoid valve according to the designated temperature,
wherein the mixing means includes a spring means for biasing an upper block and a lower block toward each other in a direction enhancing a fitting state thereof.

* * * * *